United States Patent [19]

Schuers et al.

[11] Patent Number: 5,373,829
[45] Date of Patent: Dec. 20, 1994

[54] FUEL SUPPLY SYSTEM OF AN INTERNAL-COMBUSTION ENGINE

[75] Inventors: Andreas Schuers, Kaufering; Martin Scholz, Unterschleissheim; Axel Michelet, Karlsfeld; Siegfried Wesinger, Furstenfeldbruck, all of Germany

[73] Assignee: Bayerische Motoren Werke AG, Germany

[21] Appl. No.: 84,231

[22] PCT Filed: Oct. 30, 1992

[86] PCT No.: PCT/EP92/02498

§ 371 Date: Jul. 7, 1993

§ 102(e) Date: Jul. 7, 1993

[87] PCT Pub. No.: WO93/09000

PCT Pub. Date: May 13, 1993

[30] Foreign Application Priority Data

Nov. 8, 1991 [DE] Germany .............................. 4136833

[51] Int. Cl.5 ...................... B60K 15/01; F02M 69/46; F02M 37/20
[52] U.S. Cl. ...................... 123/510; 123/514; 123/516
[58] Field of Search ............... 123/510, 495, 514, 457, 123/463, 456, 497

[56] References Cited

U.S. PATENT DOCUMENTS

| | | | |
|---|---|---|---|
| 3,762,379 | 10/1973 | Hobo et al. | 123/497 |
| 4,136,652 | 1/1979 | Lee | 123/514 |
| 4,440,138 | 4/1984 | Smith | 123/514 |
| 4,784,104 | 11/1988 | Dimond | 123/514 |
| 4,884,545 | 12/1989 | Mathis | 123/497 |
| 4,893,603 | 1/1990 | Siebels | 123/514 |
| 5,035,223 | 7/1991 | Watanabe | 123/514 |
| 5,148,792 | 9/1992 | Tuckey | 123/514 |
| 5,207,203 | 5/1993 | Wagner et al. | 123/514 |

FOREIGN PATENT DOCUMENTS

| | | |
|---|---|---|
| 2841557 | 4/1980 | Germany . |
| 3914939 | 11/1990 | Germany . |
| 59-150967 | 8/1984 | Japan . |

*Primary Examiner*—Raymond A. Nelli
*Assistant Examiner*—Thomas Moulis
*Attorney, Agent, or Firm*—Evenson, McKeown, Edwards & Lenahan

[57] ABSTRACT

Normally, the fuel pressure in a forward-flow fuel pipe leading to an internal-combustion engine is controlled in such a manner that a pressure regulator branches off a partial flow into a return-flow pipe which leads without pressure into a fuel tank. Normally, the branch-off pipe as well as the pressure regulator are arranged close to the internal-combustion engine in a closed-off engine compartment, for example, of a motor vehicle. However, as a result, not only the fuel flow returned by way of the return-flow pipe will heat up but, as a result of the waste heat of the internal-combustion engine, also the fuel volume situated in the fuel tank. As a remedy, it is suggested to arrange the branch-off pipe as well as the pressure regulator outside the engine compartment close to the fuel tank. A reversing valve as well as a rinsing pipe are also suggested in order to rinse, after the start of the internal-combustion engine, the injection strip with the complete fuel flow delivered by the pump.

6 Claims, 1 Drawing Sheet

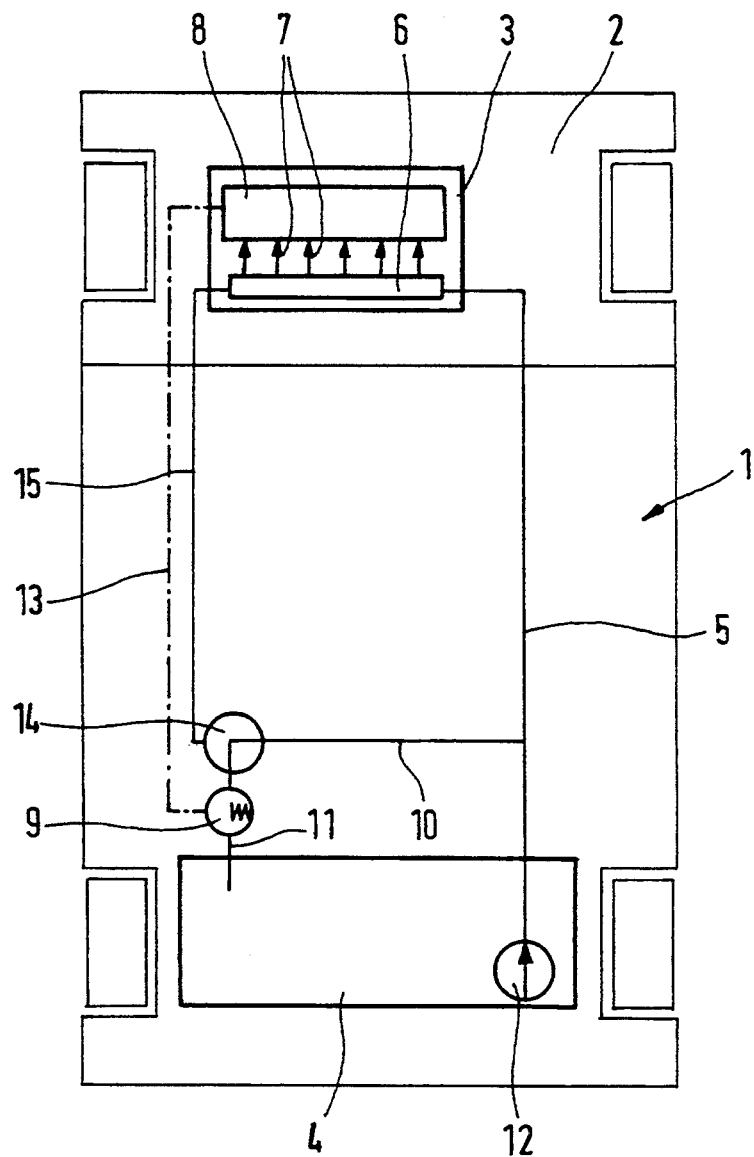

FUEL SUPPLY SYSTEM OF AN INTERNAL-COMBUSTION ENGINE

BACKGROUND AND SUMMARY OF THE INVENTION

The invention relates to a system for supplying fuel to an internal-combustion engine which is arranged in an engine compartment, a forward-flow fuel pipe, which starts from a fuel tank situated outside the engine compartment and has a pump, leading to the internal-combustion engine, and a pressure regulator being provided which connects a branch pipe branching off the forward flow pipe with a return-flow pipe leading to the fuel tank in order to adjust a desired fuel pressure in the forward-flow pipe.

From the DE 39 14 939 A1, for example, such a system for supplying fuel to an internal-combustion engine is known. In this case, the pressure regulator is arranged close to the internal-combustion engine or close to the fuel injection valves which are fastened to the internal-combustion engine suction system and branch off from the engine-compartment-side end of the forward-flow pipe. Normally, much more fuel flows through the forward-flow fuel line than will finally be required in the internal-combustion engine because the fuel volume flow is determined by the normal constant delivery output of the pump. In this case, the pump delivery output is dimensioned such that a sufficient amount of fuel is available in all possible internal-combustion engine operating points and particularly also in the operating point of the maximal nominal output. In partial-load operating points, a relatively large excess fuel volume flow is therefore available which arrives back in the fuel tank by way of the return-flow pipe. In this case, the pressure regulator adjusts the volume flow arriving in the return-flow pipe in such a manner that a defined fuel pressure exists in the forward-flow pipe. In this case, this excess fuel pressure may be defined either with respect to the ambient pressure or with respect to the pressure conditions in the suction system.

In normal internal-combustion engine operation, as indicated in the above description, a considerable amount of fuel is always transferred by pumping by way of the forward-flow and the return-flow pipe. In this case, this transferred fuel amount always travels through the engine compartment which is warmed up by the waste heat of the internal-combustion engine. This causes not only a heating of the fuel flow that was transferred by pumping but also results in a temperature rise of the whole fuel volume contained in the fuel tank. However, this rise in temperature is undesirable because easily volatile fuel constituents will then tend to evaporate.

It is therefore an object of the invention to provide measures by means of which a heating particularly of the fuel volume situated in the fuel tank by the engine compartment waste heat is largely prevented.

For achieving this object, it is provided that the branch pipe leading from the forward-flow pipe by way of the pressure regulator to the return-flow pipe as well as the pressure regulator are arranged outside the engine compartment. According further to the present invention, the branch pipe and the pressure regulator are arranged close to the fuel tank. In another preferred embodiment, the pressure regulator can be connected with the engine compartment side end of the forward-flow pipe as an alternative to the branch pipe.

According to the invention, the excess fuel flow delivered by the pump no longer travels through the engine compartment but is branched off the forward-flow pipe already outside the engine compartment. Any heating of the fuel flow returning into the fuel tank by the internal-combustion engine is therefore largely excluded. The effect according to the invention can be further increased when the branch pipe and the pressure regulator are arranged near the fuel tank. Preferably, the arrangement according to the invention is situated in a motor vehicle, in which case the internal-combustion engine as well as the engine compartment are housed in the front of the vehicle and the fuel tank is housed in the rear of the vehicle. If the pressure regulator as well as the branch pipe are then also arranged in the vehicle rear, a heating by ambient influences will then also be almost impossible. Although a fuel system for a motor vehicle is known from German Patent Document DE-OS 28 41 557, in the case of which the pressure regulator is also arranged on the fuel tank, in this known fuel system, the complete fuel quantity delivered by the pump always arrives in the engine compartment by way of the forward-flow pipe so that this will again result in a heating of the fuel flow returned by way of the pressure regulator. In the case of this known solution, a branch pipe does not exist which branches off the forward-flow pipe outside the engine compartment and by way of the pressure regulator lead into the return-flow pipe.

In order to exclude hot-start problems which may occur under the least favorable marginal conditions with a system according to the invention for the fuel supply according to the present invention, the pressure regulator may, as an alternative to the branch pipe, be connectable with the engine-compartment side end of the forward-flow pipe. This connection between the pressure regulator and the engine-compartment-side end of the forward-flow pipe will then be established for a short time at the start of the internal-combustion engine in order to intensively rinse the engine-compartment-side end of the forward-flow pipe from which the fuel injection nozzles branch off, and thus remove any possible fuel vapor bubbles. When this rinsing operation is completed, the branch pipe, which branches off from the forward-flow pipe outside the engine compartment and particularly close to the fuel tank, is connected again with the pressure regulator, and the connection between the pressure regulator and the engine-compartment-side end of the forward-flow pipe is interrupted. For this purpose, a simple reversing valve may be provided. Other objects, advantages and novel features of the present invention will become apparent from the following detailed description of the invention when considered in conjunction with the accompanying drawings.

BRIEF DESCRIPTION OF THE DRAWINGS

A preferred embodiment of a fuel supply arrangement for a motor vehicle according to the invention will be explained using a sole drawing figure, a schematic diagram of a system for supplying fuel to an internal combustion engine.

DETAILED DESCRIPTION OF THE DRAWINGS

A motor vehicle has the reference number 1. The front of this motor vehicle has a closed-off engine compartment 2 in which an internal-combustion engine 3 is arranged which drives the motor vehicle 1. In the rear of the motor vehicle 1, a fuel tank 4 is arranged. From this fuel tank 4, the internal-combustion engine 3 is supplied with fuel by way of a forward-flow pipe 5.

In detail, the internal-combustion engine 3 is equipped with a fuel injection strip 6 which is supplied with fuel by way of the forward-flow pipe 5 and therefore forms virtually the engine-compartment-side end of the forward-flow pipe 5. From this injection strip 6, the injection valves 7 branch off which are assigned to the individual cylinders of the internal-combustion engine and which lead into the suction system 8 of the internal-combustion engine 3. For a perfect functioning of these injection valves 7, a defined fuel pressure must be present in the injection strip 6. This fuel pressure is adjusted by means of a pressure regulator 9 which by way of a branch-off pipe 10 connects the forward-flow pipe 5 with a return-flow pipe 11 which leads without pressure into the fuel tank 4. Thus an excess fuel flow delivered by the fuel pump 12 is simply branched off in order to establish the desired pressure level in the injection strip 6. Since in the present case this desired pressure level is defined as the differential pressure with respect to pressure conditions existing in the suction system 8, the pressure regulator 6 is acted upon, by way of a pressure pipe 13, in addition, by the pressure existing in the suction system 8.

The branch pipe 10, which leads from the forward-flow pipe 5 by way of a reversing valve 14, which will be explained later, to the pressure regulator 9 and via this pressure regulator as well as via the return-flow pipe 11, to the fuel tank 4, like the pressure regulator 9, is arranged outside the engine compartment 2 and particularly in the vicinity of the fuel tank 4. This prevents an undesirable heating of the excess fuel volume delivered by the pump 12 and transferred by pumping by way of the branch pipe 10 as well as the return-flow pipe 11. However, when the internal-combustion engine is started, it may be desirable to deliver for a short time a large fuel volume through the injection strip 6 in order to rinse away possible fuel vapor bubbles which have formed there during the stoppage phase of the internal-combustion engine. For this reason, the injection strip 6 can be connected with its end facing away from the forward-flow pipe 5 and thus also the engine-compartment-side end of the forward-flow pipe 5 by way of a rinsing pipe 15, as an alternative to the branch pipe 10, with the pressure regulator 9. This alternative connection takes place by means of the reversing valve 14. Following a start of the internal-combustion engine 3, the whole fuel quantity delivered by the pump 12 travels for a short time by way of the injection strip 6, but within a short time, the reversing valve 14 may be brought into the other position and therefore, the branch pipe 10 can be connected with the pressure regulator 9 as well as the return-flow pipe 11 for the permanent operation of the internal-combustion engine 3. As explained in detail, this measure prevents an unnecessary heating, particularly of the fuel volume situated in the fuel tank 4 and thus an undesirable gas evolution of volatile fuel constituents.

In this case, deviations from the explained basic diagram are definitely possible without leaving the content of the patent claims. Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A system for supplying fuel to an internal-combustion engine arranged in an engine compartment of a vehicle, comprising:
   a fuel tank disposed outside the engine compartment,
   a fuel injection strip disposed adjacent the engine in the engine compartment,
   a pump for pumping fuel from the fuel tank,
   a forward fuel pipe connected between one end of the fuel injection strip and the pump and serving to supply fuel under pressure to said one end of the fuel injection strip,
   a branch pipe connected to the forward fuel pipe,
   a return flow ripe connected between the branch pipe and the fuel tank for returning fuel to the fuel tank,
   a pressure regulator interposed in the return flow pipe for adjusting fuel pressure in the return flow pipe and thus control pressure in the forward fuel pipe,
   a rinsing pipe connected to an other end of the fuel injection strip,
   and a selectively controllable reversing valve for blocking return fuel flow through the pressure regulator to the fuel tank and connecting fuel supply from the pump to said other end of the fuel injection strip by way of the rinsing pipe during predetermined engine start-up conditions, whereby fuel vapor bubbles formed during engine stoppage are rinsed away.

2. A system according to claim 1, wherein the engine compartment is located at one end of a vehicle and the fuel tank is located at another opposite end of the vehicle, and wherein the branch pipe, return flow pipe, and pressure regulator are located adjacent the fuel tank and outside the fuel tank.

3. A system according to claim 2, wherein the branch pipe, return flow pipe, and pressure regulator are disposed remotely of the engine compartment to minimize transmission of engine compartment waste heat to fuel returned to the fuel tank by way of said branch pipe and pressure regulator.

4. A system according to claim 1, wherein the branch pipe, return flow pipe, and pressure regulator are disposed remotely of the engine compartment to minimize transmission of engine compartment waste heat to fuel returned to the fuel tank by way of said branch pipe and pressure regulator.

5. A method of supplying fuel to an internal combustion engine arranged in a vehicle engine compartment from a fuel tank disposed outside the engine compartment, said method comprising:
   pumping fuel under pressure from the fuel tank into a forward fuel pipe connected to one end of a fuel injection strip at the engine, and
   returning excess fuel from the forward fuel pipe to the fuel tank by way of a branch pipe a return flow pipe, and a pressure regulator during normal engine operating conditions,
   comprising selectively operating during engine start-up conditions with communication of rinsing fuel from the fuel pump via a rinsing pipe to an opposite end of the fuel injection strip while blocking return flow through the pressure regulator, whereby fuel vapor bubbles formed during a prior engine stoppage are rinsed away.

6. A method according to claim 5, wherein the branch pipe, return flow pipe, and pressure regulator are disposed remotely of the engine compartment to minimize transmission of engine compartment waste heat to fuel returned to the fuel tank by way of said branch pipe and pressure regulator.

* * * * *